UNITED STATES PATENT OFFICE.

J. B. PALSER AND GARDNER HOWLAND, OF FORT EDWARD, NEW YORK.

IMPROVEMENT IN THE MANUFACTURE OF PAPER-PULP.

Specification forming part of Letters Patent No. 24,481, dated June 21, 1859; Reissue No. 997, dated July 3, 1860; Reissue No. 1,591, dated December 15, 1863.

*To all whom it may concern:*

Be it known that we, J. B. PALSER and G. HOWLAND, of Fort Edward, in the county of Washington and State of New York, have invented a new and useful article of manufacture, which we denominate "Staple Fiber;" and we do hereby declare that the following is a full, clear, and exact description of the same.

Our staple fiber is a fibrous material produced from common rye or wheat straw or similar stalks by removing the glutinous and resinous matter with which said material is combined in the plants, and is in a suitable condition for the manufacture of paper.

The mode of producing this article, which we have essayed with success, is as follows: The straw or other material is cut into short lengths—say three-quarters of an inch in length—by a suitable cutting apparatus—such, for example, as is used for cutting straw for food for animals. It is winnowed, to separate impurities, and is then crushed by passing it between a pair of iron rollers. The straw thus prepared is charged into a cylindrical boiler with a solution of caustic soda of a strength of about $3\frac{1}{2}°$ or $3\frac{3}{4}°$ of Baumé's hydrometer in the proportion of sixty gallons of the solution to one hundred pounds of straw. The boiler is constructed to revolve slowly on journals projecting from the centers of its heads, and is placed in a furnace, so that its exterior can be highly heated. It must also be connected by a pipe passing through a stuffing-box in one of the trunnions with a safety-valve and steam-gage, and must be of sufficient strength to withstand an internal pressure of one hundred and thirty pounds per square inch with safety. After the materials are charged into the boiler, it is closed tightly, and sufficient heat is applied to the exterior to cause the pressure within to rise to from one hundred and ten to one hundred and thirty pounds. The pressure, heat, and slow rotation are continued about four hours, after which the heating is discontinued and the steam within the boiler is permitted to escape by a stop-cock. The boiler is then opened, and its contents are discharged. The matter discharged is then thoroughly washed by water, when, if the operation has been properly conducted, it will be found that the fibrous matter, which we call "staple fiber," is separated from the glutinous and other matters with which it was combined in the straw, and is in a suitable condition to be manufactured into paper by bleaching and the other usual processes. If the manufacture of the staple fiber is conducted at the paper-manufactory, the article may be used in the state it exists in after washing and draining. If it is conducted at a distance from the paper-manufactory, it may be dried, after washing and draining, either by exposure to the solar rays and the atmosphere or by hot air or by any suitable rotary or other drying apparatus. The dried article may then be packed in bales for the market. The dry article requires to be wet with water before it is used in the paper manufacture.

The article produced as above described is susceptible of use for many purposes, among which may be mentioned the manufacture of paper and that class of articles known as "papier-maché." In making it into paper it may be used as the ordinary paper-stock known as "half-stuff," produced from rags, and does not require any admixture of cotton or linen stock.

Having thus described our invention, we claim and desire to secure by Letters Patent—

As a new article of manufacture, the staple fiber, made substantially as herein set forth.

In testimony whereof we have hereunto subscribed our names.

J. B. PALSER.
GARDNER HOWLAND.

Witnesses:
W. I. SIMMONS,
D. MAHAN.